United States Patent
Spearman et al.

[11] Patent Number: 6,145,674
[45] Date of Patent: Nov. 14, 2000

[54] SUPPORT DEVICE FOR PLATE-LIKE WEIGHTS

[76] Inventors: Carey J. Spearman; Laraine Hinson-Spearman, both of 57 Swan St., Staten Island, N.Y. 10301

[21] Appl. No.: 09/258,330

[22] Filed: Feb. 25, 1999

[51] Int. Cl.[7] ................................................. A47F 7/00
[52] U.S. Cl. .................................. 211/59.1; 211/85.7
[58] Field of Search ........................... 211/59.1, 17, 85.7

[56] References Cited

U.S. PATENT DOCUMENTS

| | | | |
|---|---|---|---|
| 2,284,518 | 5/1942 | Green | 211/59.1 X |
| 2,682,956 | 7/1954 | Pike | 211/59.1 X |
| 3,161,264 | 12/1964 | Isaacson | 362/341 X |
| 4,209,099 | 6/1980 | Wickes | 211/182 |
| 4,254,879 | 3/1981 | Maule | 211/59.1 X |
| 4,360,936 | 11/1982 | Keller | 5/9 |
| 5,086,930 | 2/1992 | Saeks | 211/17 |
| 5,092,504 | 3/1992 | Hannes et al. | 211/17 X |
| 5,306,220 | 4/1994 | Kearney | 482/94 |
| 5,688,098 | 11/1997 | Theno | 211/59.1 X |
| 5,862,921 | 1/1999 | Venegas, Jr. | 211/17 |

*Primary Examiner*—Daniel P. Stodola
*Assistant Examiner*—Erica B. Harris

[57] ABSTRACT

A support device for plate-like weights for storing weights in minimal space. The support device for plate-like weights includes at least one central shaft with opposite upper and lower ends and a longitudinal axis extending between the ends. The upper and lower ends are adapted for securing to a ceiling and a floor. A plurality of horizontal shafts extend from the central shaft generally perpendicular to the longitudinal axis of the central shaft. The horizontal shafts are adapted for receiving a plurality of weight plates.

2 Claims, 4 Drawing Sheets

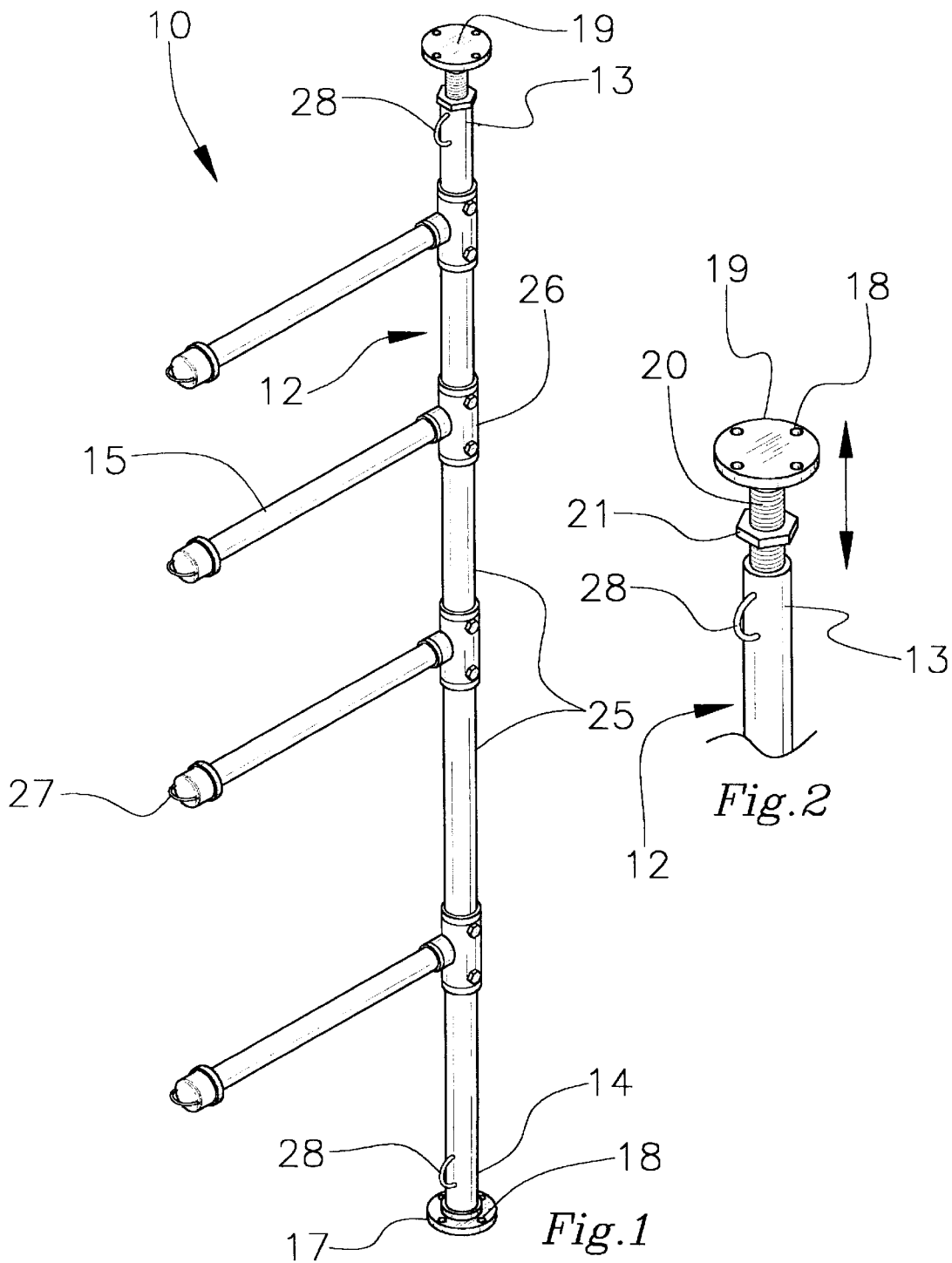

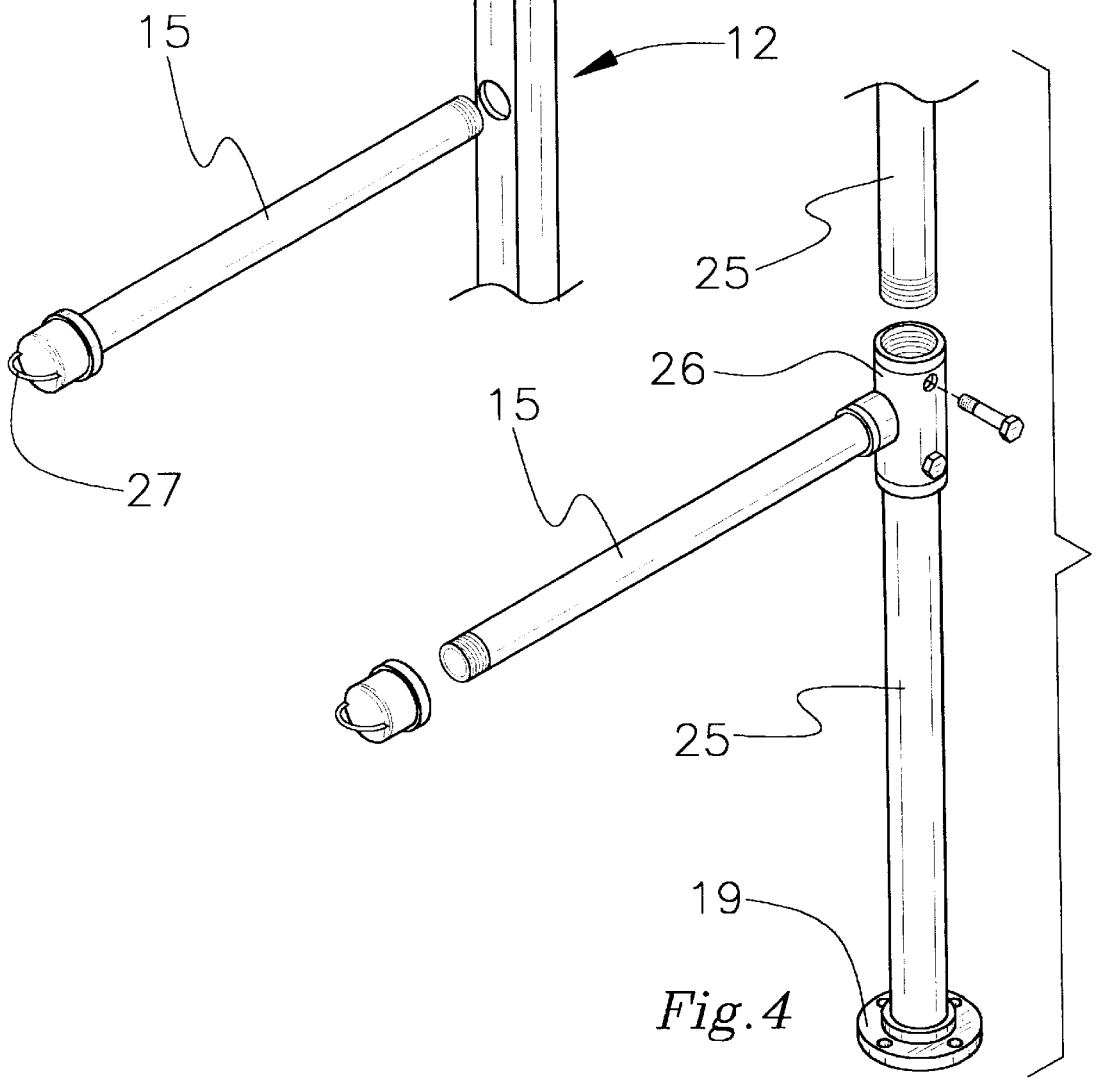

SUPPORT DEVICE FOR PLATE-LIKE WEIGHTS

BACKGROUND OF THE INVENTION

1. Field of the Invention

The present invention relates to storage systems and more particularly pertains to a new support device for plate-like weights for storing weights in minimal space.

2. Description of the Prior Art

The use of storage systems is known in the prior art. More specifically, storage systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,086,930; 4,971,593; 853,762; 4,903,846; Des. 339,009; and 3,364,747.

While these devices fulfill their respective, particular objectives and requirements, the aforementioned patents do not disclose a new support device for plate-like weights. The inventive device includes at least one central shaft with opposite upper and lower ends and a longitudinal axis extending between the ends. The upper and lower ends are adapted for securing to a ceiling and a floor. A plurality of horizontal shafts extend from the central shaft generally perpendicular to the longitudinal axis of the central shaft. The horizontal shafts are adapted for receiving a plurality of weight plates.

In these respects, the support device for plate-like weights according to the present invention substantially departs from the conventional concepts and designs of the prior art, and in so doing provides an apparatus primarily developed for the purpose of storing weights in minimal space.

SUMMARY OF THE INVENTION

In view of the foregoing disadvantages inherent in the known types of storage systems now present in the prior art, the present invention provides a new support device for plate-like weights construction wherein the same can be utilized for storing weights in minimal space.

The general purpose of the present invention, which will be described subsequently in greater detail, is to provide a new support device for plate-like weights apparatus and method which has many of the advantages of the storage systems mentioned heretofore and many novel features that result in a new support device for plate-like weights which is not anticipated, rendered obvious, suggested, or even implied by any of the prior art storage systems, either alone or in any combination thereof.

To attain this, the present invention generally comprises at least one central shaft with opposite upper and lower ends and a longitudinal axis extending between the ends. The upper and lower ends are adapted for securing to a ceiling and a floor. A plurality of horizontal shafts extend from the central shaft generally perpendicular to the longitudinal axis of the central shaft. The horizontal shafts are adapted for receiving a plurality of weight plates.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new support device for plate-like weights apparatus and method which has many of the advantages of the storage systems mentioned heretofore and many novel features that result in a new support device for plate-like weights which is not anticipated, rendered obvious, suggested, or even implied by any of the prior art storage systems, either alone or in any combination thereof.

It is another object of the present invention to provide a new support device for plate-like weights which may be easily and efficiently manufactured and marketed.

It is a further object of the present invention to provide a new support device for plate-like weights which is of a durable and reliable construction.

An even further object of the present invention is to provide a new support device for plate-like weights which is susceptible of a low cost of manufacture with regard to both materials and labor, and which accordingly is then susceptible of low prices of sale to the consuming public, thereby making such support device for plate-like weights economically available to the buying public.

Still yet another object of the present invention is to provide a new support device for plate-like weights which provides in the apparatuses and methods of the prior art some of the advantages thereof, while simultaneously overcoming some of the disadvantages normally associated therewith.

Still another object of the present invention is to provide a new support device for plate-like weights for storing weights in minimal space.

Yet another object of the present invention is to provide a new support device for plate-like weights which includes at least one central shaft with opposite upper and lower ends and a longitudinal axis extending between the ends. The upper and lower ends are adapted for securing to a ceiling and a floor. A plurality of horizontal shafts extend from the central shaft generally perpendicular to the longitudinal axis of the central shaft. The horizontal shafts are adapted for receiving a plurality of weight plates.

Still yet another object of the present invention is to provide a new support device for plate-like weights that is adjustable so that it may extend from floor to ceiling for stability.

Even still another object of the present invention is to provide a new support device for plate-like weights that can lock the weights on to prevent injury to children.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new support device for plate-like weights according to the present invention.

FIG. 2 is a schematic detailed perspective view of the present invention.

FIG. 3 is a schematic detailed perspective view of an alternate embodiment of the present invention.

FIG. 4 is a schematic exploded view of the present invention.

DESCRIPTION OF THE PREFERRED EMBODIMENT

Figure 5:
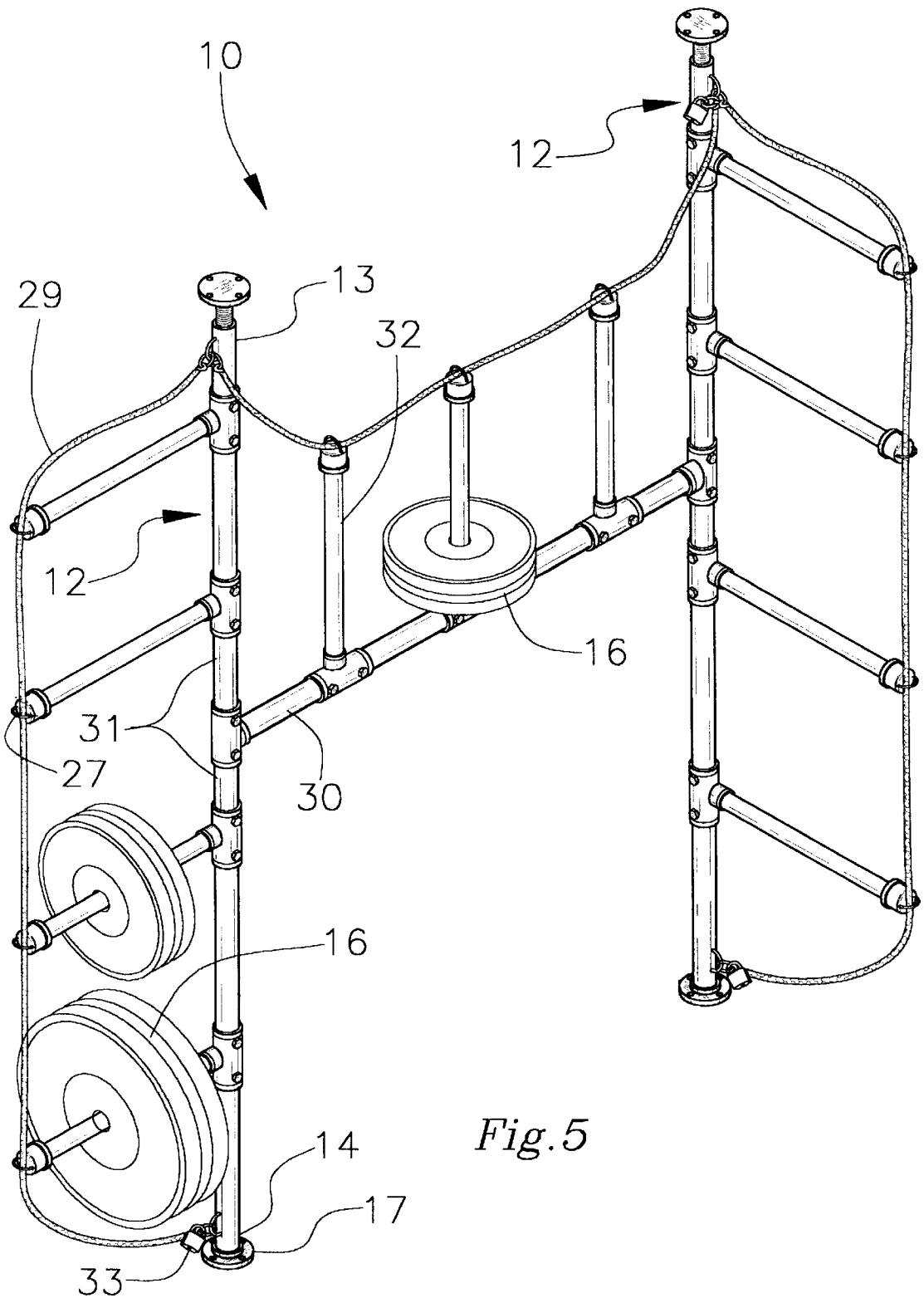
FIG. 5 a schematic perspective view of a larger version of the present invention.

With reference now to the drawings, and in particular to FIGS. 1, 2, 4, and 5 a new support device for plate-like weights embodying the principles and concepts of the present invention and generally designated by the reference numeral 10 will be described.

As best illustrated in FIGS. 1 through 6, the support device for plate-like weights 10 generally comprises at least one central shaft 12 with opposite upper and lower ends 13,14 and a longitudinal axis extending between the ends. The upper and lower ends are adapted for securing to a ceiling and a floor. A plurality of horizontal shafts 15 extend from the central shaft generally perpendicular to the longitudinal axis of the central shaft. The horizontal shafts are adapted for receiving a plurality of weight plates 16.

The central shaft configuration is substantially equal for a device having a single central shaft, as illustrated in FIG. 1, or multiple central shafts, as shown in FIG. 5. Therefore, the following discussion shall be to a model having multiple central shafts, keeping in mind that the description may be equally applicable to the single central shaft configuration.

A pair of central shafts each have opposite upper and lower ends and a longitudinal axis extending between the ends. The upper and lower ends are adapted for securing to a ceiling and a floor. A plurality of horizontal shafts extend from the central shafts generally perpendicular to the longitudinal axes of the central shafts, ideally aligned in a vertical plane. The horizontal shafts are adapted for receiving a plurality of weights.

The preferred outer diameter of each of the horizontal shafts is about 1½ inches. The preferred length of each of the horizontal shafts is about 24 inches. This length permits many weights to be stacked on the horizontal shaft without allowing so much torque that the central shaft would be pulled out of the ceiling.

Preferably, the lower end of each of the central shafts has a circular lower flange 17 coupled to it that has a plurality of mounting holes 18. The lower flanges are adapted for securing to a floor. The mounting holes are adapted for receiving threaded fasteners (not shown) therethrough.

Also preferably, each of the upper ends of the central shafts has a circular upper flange 19 coupled to it that is adapted for securing to a ceiling. Each of the upper flanges has a plurality of mounting holes that are adapted for receiving threaded fasteners therethrough.

Ideally, the upper flanges are adjustably coupled to the upper end of the central shaft such that the upper flanges are positionable towards and away from the associated upper end of the central shafts along the longitudinal axis of the associated central shaft. Two means for doing this are illustrated in FIGS. 2 and 3. As shown in FIG. 2, a pair of threaded shafts 20 are telescopically inserted in the upper ends of the central shafts and extending through adjusting nuts 21. The upper flanges are coupled to the threaded shafts. The adjusting nuts threadedly engage the threaded shafts for adjusting a distance between the upper ends of the central shafts and the associated upper flange.

As illustrated in FIG. 3, a generally rectangular holed shaft 22 is telescopically inserted in the upper end of each central shaft. The upper end of the central shaft has a lateral aperture 23 therethrough. The upper flange is coupled to the holed shaft. An adjustment bolt 24 extends through the lateral aperture of the central shaft and into a hole of the holed shaft for locking the holed shaft in a fixed vertical position with respect to the central shaft.

Preferably, each of the central shafts comprises a plurality of alternating short members 25 and generally T-shaped couplers 26. The horizontal shafts are detachably coupled to the couplers. The preferred outer diameter of each of the short members is about 2 inches.

Optionally, each of the horizontal shafts has an end loop 27 coupled to a free end thereof. Each of the central shafts has a pair of securing loops 28 positioned towards the upper and lower ends thereof. A pair of locking lines 29 such as a cable, chain, or the like are removably extended through the end loops of the horizontal shafts and the securing loops of the central shaft for preventing removal of weights from the horizontal shafts to prevent theft. This is also a safety feature to prevent children from pulling weights off of the horizontal members and onto themselves or others.

A cross member 30 may extend between central portions 31 of the central shafts. In such an embodiment, the cross member has a plurality of vertical members 32 extending generally perpendicular therefrom, ideally aligned in a vertical plane. The vertical shafts are adapted for receiving a plurality of weight plates.

Optionally, each of the vertical shafts has an end loop 27 coupled to a free end thereof. A third locking line is removably extended through the end loops of the vertical shafts and the securing loops of the central shaft for preventing removal of weights from the vertical shafts to prevent theft.

A plurality of padlocks 33 secure the locking lines to the loops.

In use, the lower flanges of the central shafts are coupled to the floor. Each upper flange is adjusted so that it exerts pressure on the ceiling and fixed in place with the threaded shaft and adjusting nut, or holes and adjustment bolt. Threaded fasteners may be inserted in the apertures of the flanges to fasten them to the floor and ceiling. Weights are placed on the horizontal and vertical shafts for storage, as illustrated in FIG. 5. The line may be run through the loops, as also shown in FIG. 5, to lock the weights in place.

Figure 6:
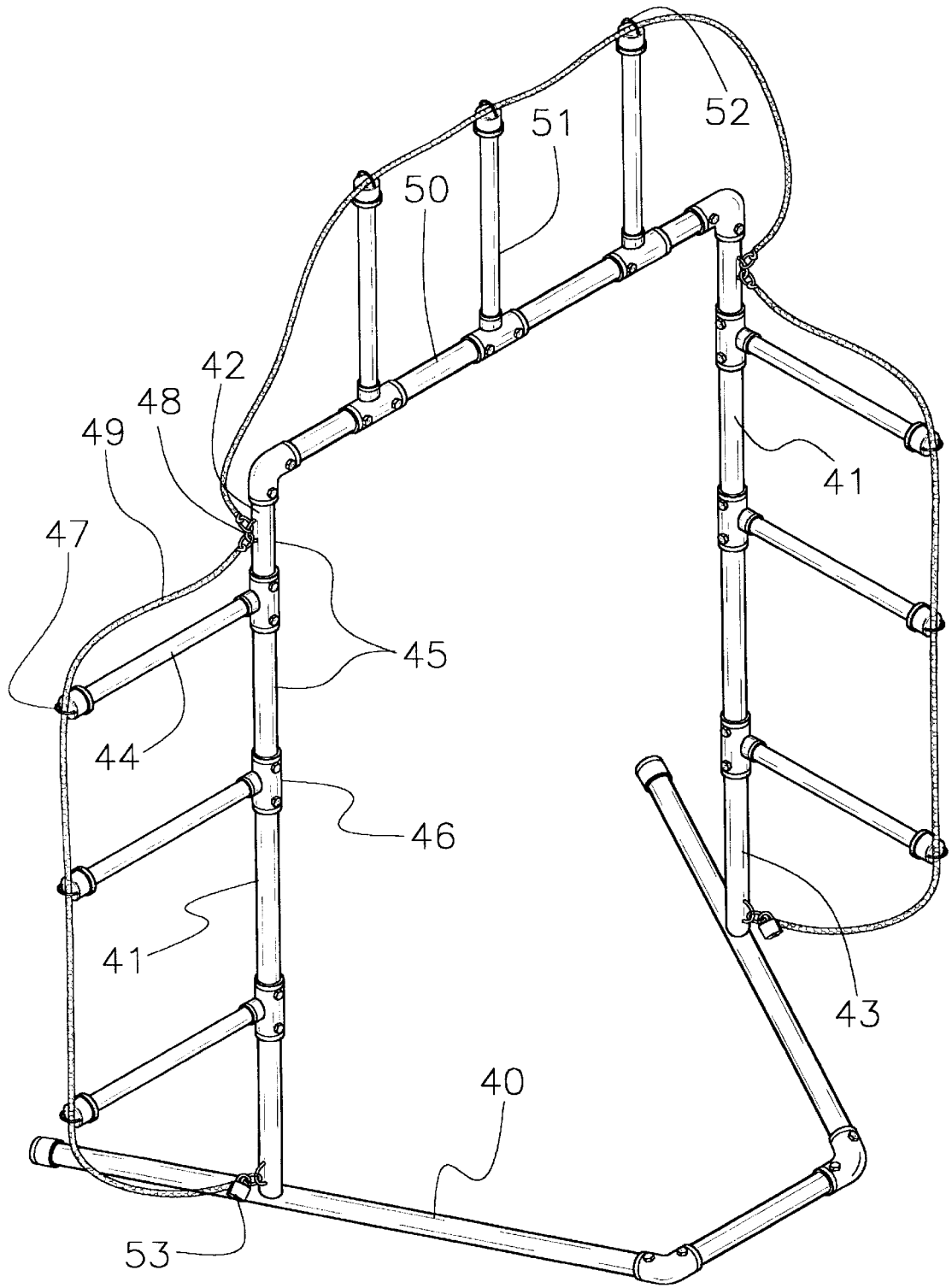
FIG. 6 is a schematic side view of a freestanding model of the present invention.

A third embodiment, illustrated in FIG. 6, has a generally U-shaped base member 40. The U-shape of the base member provides greater stability when moving the device. A pair of side shafts 41 each have opposite upper and lower ends 42,43 and a longitudinal axis extending between the ends. The lower ends are secured to the base member. A plurality of horizontal shafts 44 extend from the side shafts generally perpendicular to the longitudinal axes of the side shafts, ideally aligned in a vertical plane. The horizontal shafts are adapted for receiving a plurality of weight plates.

The preferred outer diameter of each of the horizontal shafts are about 1½ inches. The preferred length of each of the horizontal shafts are about 24 inches. This length permits many weights to be stacked on the horizontal shaft without allowing so much torque that the side shaft would be pulled out of the ceiling.

Preferably, each of the side shafts comprising a plurality of alternating short members 45 and generally T-shaped couplers 46. The horizontal shafts are detachably coupled to the couplers. The preferred outer diameter of each of the short members is about 2 inches.

Each of the horizontal shafts may have an end loop 47 coupled to a free end thereof. Each of the side shafts has a pair of securing loops 48 positioned towards the upper and lower ends thereof. A pair of locking lines 49 such as a cable, chain, or the like are removably extended through the end loops of the horizontal shafts and the securing loops of the side shaft for preventing removal of weights from the horizontal shafts to prevent theft. This also are a safety feature to prevent children from pulling weights off of the horizontal members and onto themselves or others.

A cross member 50 extends between the upper ends of the side shafts. The cross member has a plurality of vertical members 51 extending generally perpendicular therefrom, ideally aligned in a vertical plane. The vertical shafts are adapted for receiving a plurality of weights.

Each of the vertical shafts may also have an end loop 52 coupled to a free end thereof. A third locking line would be removably extended through the end loops of the vertical shafts and the securing loops of the side shaft for preventing removal of weights from the vertical shafts to prevent theft.

Again a plurality of padlocks 53 would secure the locking lines to the loops.

In use, weights are placed on the horizontal and vertical shafts for storage. The line may be run through the loops to lock the weights in place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A support device for storing plate-like weights, comprising:

a pair of central shafts each having opposite upper and lower ends and a longitudinal axis extending between said ends, said upper and lower ends being for securing to a ceiling and a floor;

a plurality of horizontal shafts extending from said central shafts generally perpendicular to said longitudinal axes of said central shafts such that said plurality of horizontal shafts are aligned in a vertical plane, said horizontal shafts being adapted for receiving a plurality of weight plates;

each of said horizontal shafts having a diameter of about one and one-half inches and a length of about twenty-four inches, said length being for preventing a torque from being applied to said central shaft;

said lower end of each of said central shafts having a circular lower flange coupled thereto, said lower flange having a plurality of mounting holes therein, said lower flanges being adapted for securing to a floor, said mounting holes being adapted for receiving threaded fasteners therethrough;

each of said upper ends of said central shafts having a circular upper flange coupled thereto, said upper flange having a plurality of mounting holes therein, said upper flange being adapted for securing to a ceiling, said mounting holes being adapted for receiving threaded fasteners therethrough;

wherein said upper flanges are adjustably coupled to said upper end of said central shaft such that said upper flanges are positionable towards and away from the associated upper end of said central shafts along said longitudinal axis of the associated central shaft;

a pair of threaded shafts being telescopically inserted in said upper ends of said central shafts and extending through adjusting nuts, said upper flanges being coupled to said threaded shafts, said adjusting nuts threadedly engaging said threaded shafts for adjusting a distance between said upper ends of said central shafts and the associated upper flange;

each of said central shafts comprising a plurality of alternating short members and generally T-shaped couplers, said horizontal shafts being detachably coupled to said couplers;

each of the horizontal shafts having an end loop coupled to a free end thereof;

each of said central shafts having a pair of securing loops positioned towards said upper and lower ends thereof;

a pair of locking lines, each of said locking lines being removably extended through each of said end loops of said horizontal shafts and each of said securing loops of one of said central shafts for preventing removal of weights from said horizontal shafts;

a cross member extending between central portions of said central shafts, said cross member having a plurality of vertical members extending generally perpendicular therefrom such that said plurality of vertical members are aligned in a vertical plane, said vertical shafts being adapted for receiving a plurality of weight plates, said vertical plane of said vertical members being coplanar with said plurality of horizontal shafts such that the plurality of weight plates on said vertical shafts provide counterbalancing for the weight plates on said horizontal members;

each of said vertical shafts having an end loop coupled to a free end thereof;

a third locking line being removably extended through each of said end loops of said vertical shafts and each of said securing loops of said central shaft for preventing removal of weights from said vertical shafts; and a plurality of padlocks for securing said locking lines to said loops.

2. A free standing support device for storing plate-like weights, comprising:

a generally U-shaped base member;

a pair of side shafts each having opposite upper and lower ends and a longitudinal axis extending between said ends, said lower ends being secured to said base member;

a plurality of horizontal shafts extending from said side shafts generally perpendicular to said longitudinal axes of said side shafts such that said plurality of horizontal shafts are aligned in a vertical plane, said horizontal shafts being adapted for receiving a plurality of weight plates;

each of said horizontal shafts having a diameter of about one and one-half inches and a length of about twenty-four inches, said length being for preventing a torque from being applied to said central shaft;

each of said side shafts comprising a plurality of alternating short members and generally T-shaped couplers, said horizontal shafts being detachably coupled to said couplers;

each of the horizontal shafts having an end loop coupled to a free end thereof;

each of said side shafts having a pair of securing loops positioned towards said upper and lower ends thereof;

a pair of locking lines, each of said locking lines being removably extended through each of said end loops of said horizontal shafts and each of said securing loops of one of said side shafts for preventing removal of weights from said horizontal shafts;

a cross member extending between said upper ends of said side shafts, said cross member having a plurality of vertical members extending generally perpendicular therefrom such that said plurality of vertical members are aligned in a vertical plane, said vertical shafts being adapted for receiving a plurality of weights, said vertical plane of said vertical members being coplanar with said plurality of horizontal shafts such that the plurality of weight plates on said vertical shafts provide counterbalancing for the weight plates on said horizontal members;

each of said vertical shafts having an end loop coupled to a free end thereof;

a third locking line being removably extended through each of said end loops of said vertical shafts and each of said securing loops of said side shaft for preventing removal of weights from said vertical shafts; and a plurality of padlocks for securing said locking lines to said loops.

\* \* \* \* \*